United States Patent [19]

Hollenbeck et al.

[11] Patent Number: 4,809,783

[45] Date of Patent: Mar. 7, 1989

[54] METHOD OF DISSOLVING ORGANIC FILTER CAKE

[75] Inventors: Keith H. Hollenbeck; Lewis R. Norman, both of Duncan, Okla.

[73] Assignee: Halliburton Services, Duncan, Okla.

[21] Appl. No.: 144,837

[22] Filed: Jan. 14, 1988

[51] Int. Cl.⁴ ............................................. E21B 43/27
[52] U.S. Cl. ................................. 166/307; 252/8.553
[58] Field of Search ............... 166/271, 281, 300, 307; 252/8.553

[56] References Cited

U.S. PATENT DOCUMENTS

| | | | |
|---|---|---|---|
| 2,011,579 | 8/1935 | Heath et al. | 166/307 |
| 2,663,689 | 12/1953 | Kingston et al. | 166/307 X |
| 3,455,388 | 7/1969 | Huitt | 166/281 X |
| 4,151,879 | 5/1979 | Thomas | 166/307 |
| 4,160,483 | 7/1979 | Thomas et al. | 166/307 |
| 4,343,363 | 8/1982 | Norton et al. | 166/281 |
| 4,479,543 | 10/1984 | Kalfayan et al. | 166/281 X |
| 4,609,475 | 9/1986 | Hanlon et al. | 166/307 X |
| 4,686,052 | 8/1987 | Baranet et al. | 166/308 X |

OTHER PUBLICATIONS

SPE 15629 "Proppant Rock Impairment During Hydraulic Fracturing", by L. Roodhart, T. O. Kuiper, and D. R. Davies, Koninklijke/Shell E & P Laboratorium.

Primary Examiner—George A. Suchfield
Attorney, Agent, or Firm—Robert A. Kent

[57] ABSTRACT

A method of increasing the production of hydrocarbons from a subterranean formation wherein an undesirable filter cake is present, resulting from the introduction of gelled polysaccharide containing fluids into the formation, comprising contacting the formation with an effective amount of a treatment fluid comprising a soluble source of fluoride ions present in an amount sufficient to provide a molar concentration of from about 0.01 about 0.5, having a pH in the range of from about 2 to about 4, whereby at least a portion of the filter cake is caused to dissolve.

20 Claims, No Drawings

METHOD OF DISSOLVING ORGANIC FILTER CAKE

BACKGROUND OF THE INVENTION

1. Field of the Invention

This invention relates to a method of dissolving and removing organic filter cakes from the face of a formation fracture and formation pores utilizing a controlled pH fluid.

2. Description of the Prior Art

Hydraulic fracturing is commonly employed to increase the production of fluids from a subterranean formation. Hydraulic fracturing involves the injection of a suitable fracturing fluid down a well penetrating a formation and into the formation under sufficient pressure to create a crack or fracture in the formation. The created crack or passageway facilitates the flow of fluids through the formation and into the well.

In a typical fracturing treatment a particulate propping agent such as sand, sintered bauxite, glass beads, alumina, resin coated sand or the like is introduced into the created fracture to assist in keeping the fracture at least partially propped in an open position. The propped open passageway further enhances the flow of formation fluids. To facilitate transport of the proppant material into the created fractures, the fracturing fluid typically is viscosified with one or more of the various well know polysaccharide or synthetic polymer gelling agents. The gelling agent imparts viscosity to the fluid thereby permitting enhanced proppant transport and reduces fluid loss from the fracturing fluid to the formation. As the gelled fracturing fluid is introduced into contact with the subterranean formation, a portion of the fluid leaks off into the formation. As the fluid leaks off into the formation matrix, the gelling agent is stripped from the fluid. The stripped gelling agent is deposited on the face of the created fracture and is concentrated thereon by the action of filtration as additional fluid leaks-off. This layer of gelling agent often is referred to as "filter cake" and is desirable during fracture initiation and propagation because it minimizes fluid loss from the fracturing fluid. The gelling agent often is admixed with a crosslinking agent to further enhance the viscosity of the fracturing fluid. While the crosslinked gels are particularly effective at reducing fluid loss and effecting proppant placement, they form a particularly tough, leathery filter cake which is generally insoluble in aqueous fluids.

Combination fracture-acidizing processes also are well know in the art. In such processes an aqueous acid is utilized in the formation resulting in enhanced formation permeability.

Upon conclusion of the fracturing treatment the fracture is permitted to close upon the propping agent distributed within the fracture. The closure may result in a portion of the filter cake being forced into the proppant bed within the fracture thereby plugging the flow channels in close proximity to the face of the fracture. These flow channels often exhibit the highest fluid conductivity. The presence of the filter cake significantly reduces the fracture flow capacity. Also, a portion of the filter cake may be forced into the formation pores reducing the matrix permeability.

It would be desirable to provide a method by which the filter cake can be removed from the face of the fracture in the formation and the pores of the formation matrix and thereby increase the fracture flow capacity.

SUMMARY OF THE INVENTION

The present invention is a method for increasing the production of fluids from a subterranean formation wherein undesirable filter cake is present, resulting from the introduction of crosslinked gelled fluids into the formation, by dissolution and removal of the filter cake. The method is carried out by contacting the filter cake with a fluid having a source of fluoride ions, a source of hydrogen ions sufficient to provide a pH of from about 2 to about 4 for the fluid and in some embodiments an oxidizer such as sodium persulfate whereby the filter cake is dissolved. Boric acid may be present to prevent undesirable calcium fluoride precipitate formation in the subterranean formation.

DESCRIPTION OF THE PREFERRED EMBODIMENT

The method of the present invention has been found to have particular applicability to the removal of filter cakes from the face of a fracture wherein the filter cake comprises a substantially water insoluble metal ion-polysaccharide complex resulting from the use of a crosslinked gelled treatment fluid in treating the subterranean formation. The process has been found to be particularly effective when the metal ion-polysaccharide complex filter cake contains titanium or zirconium ions.

In accordance with the method of the present invention, a treatment fluid is prepared containing a source of fluoride ions and a source of hydrogen ions sufficient to produce a pH in the fluid in the range of from about 2 to about 4. The treatment fluid also can contain an oxidizer capable of further degrading the partially gelled polysaccharide complex which is present in the subterranean formation after the metal ion-polysaccharide complex has been broken. The treatment fluid also may include a quantity of boric acid or a similar compound to prevent the formation of any undesirable calcium fluoride precipitates or the like upon contact of the treatment fluid with the subterranean formation.

The treatment fluid may be introduced into a subterranean formation containing metal ion-polysaccharide complex filter cake immediately following the treatment in which the filter cake is created or at any time thereafter. The treatment fluid may even be used as a final portion of the fluid used in the stimulation treatment which creates the filter cake in the subterranean formation. Preferably, the treatment fluid is introduced into a subterranean formation shortly after conclusion of the fracturing treatment or other treatment which produced the undesirable filter cake which is to be removed. The treatment fluid is introduced into the subterranean formation, in this instance, at a rate below that required to fracture the formation through a wellbore penetrating the subterranean formation whereby any proppant previously placed in the subterranean formation will remain substantially undisturbed. If the fluid is introduced at a rate sufficient to open the fractures, the proppant may be displaced or permitted to settle whereby fracture conductivity may be undesirably affected.

The treatment fluid is maintained in the subterranean formation for a sufficient time to permit the fluid to act upon the metal ion-polysaccharide complex filter cake and dissolve at least a portion of such filter cake. The treatment fluid preferable is maintained within the subterranean formation for a period of at least one hour. Most preferably, the treatment fluid is maintained in the subterranean formation for a period of from about 3 to about 12 hours. It is to be understood that longer times may be utilized, however, such longer shut-in times do not appear to significantly improve the overall effectiveness of the treatment in removing at least a portion of the filter cake from the subterranean formation. Upon completion of the treatment, at least a portion of the treatment fluid preferably is flowed back out of the well through which it was injected into the subterranean formation.

The treatment fluid can be prepared by the dissolution of various complex fluorides such as sodium tetrafluoroborate or magnesium fluorosilicate which hydrolyze to yield the required acidic solution. The treatment fluid also may be prepared by the addition of neutral fluoride salts such as sodium fluoride, magnesium fluoride, or any of the other alkali metal or ammonium salts or the like to an aqueous fluid which is acidified to a pH in the range of from about 2 to 4 to form a effective treatment fluid. For example, an aqueous solution of sodium fluoride can be acidified with sulfamic acid to yield a treatment fluid having a pH of about 3 which is effective in dissolving at least a portion of the filter cake. A solution also could be prepared, for example, by acidifying a solution of magnesium fluoride with nitric acid. Such a treatment fluid will very rapidly destroy the filter cake without any substantial residue.

The source of fluoride ions is present in an amount sufficient to provide a fluoride ion concentration of from about 0.01 to about 0.5 moles per liter of treatment fluid. Preferably, the fluoride ions are present in an amount of from about 0.1 to about 0.3 moles per liter of treatment fluid. The hydrogen ion source is present in an amount sufficient to provide a treatment fluid having a pH in the range of from about 2 to about 4. Preferably, the hydrogen ion source is present in an amount sufficient to provide a pH in the range of from about 2.5 to about 3.5. The hydrogen ion source can comprise the products of hydrolysis such as from sodium tetrafluoroborate, various mineral acids or the like. Surprisingly, it has been found that pH values lower than about 2 for the treatment fluid result in the formation of undesirable substantially insoluble residues during removal of the filter cake which can result in damage to the subterranean formation permeability. While the specific cause for the residues are unknown, it is believed the higher acidity results in ancillary reactions by the acid on formation constituents or the constituents of the filter cake resulting in the formation of the substantially insoluble residues or alternatively, rapid spending of the acid whereby insufficient acid is present in the treatment fluid to function in conjunction with the fluoride ions to break the metal ion-polysaccharide complex of the filter cake resulting in the residues.

The oxidizer can be present in an amount of from about 0.001 to about 0.1 moles per liter of the treatment fluid. The oxidizer can comprise sodium persulfate, ammonium persulfate, potassium persulfate and the like. When the temperature of the formation to be treated is below about 120° F., the oxidizer can be replaced by the various well known enzyme breakers for polysaccharide gelling agents.

One preferred treatment fluid composition comprises an aqueous solution containing from about 0.5 to about 1.5 weight percent hydrochloric acid, from about 25 to about 75 pounds of ammonium bifluoride per 1000 gallons of treatment fluid, from about 25 to about 75 pounds of boric acid per 1000 gallons of treatment fluid and from about 3 to about 7 pounds of sodium persulfate per 1000 gallons of treatment fluid. The treatment fluid also may contain other conventional additives such as corrosion inhibitors, fluid loss additives and the like.

To further illustrate the method of the present invention, but not by way of limitation, the following examples are provided.

EXAMPLE I

A filter cake sample was prepared by flowing a crosslinked gelled fluid through a core sample in a fluid loss cell at 1000 psi. The fluid comprised an aqueous gel containing 50 pounds of gelling agent per 1000 gallons of aqueous fluid and produced a filter cake having a gelling agent concentration averaging 140 pounds of hydroxypropylguar per 1000 gallons of fluid crosslinked with a titanium chelate. The filter cake had the appearance of a tough, transparent, leathery mat. Samples of the filter cake were placed in vessels containing the following treatment fluids which were maintained at 150° F. in a water bath. The samples were inspected periodically to determine the effect of the treatment fluids upon the filter cake.

| Treatment Fluid | Effect |
| --- | --- |
| 1. Dionized water | No apparent dissolution after 48 hours |
| 2. 7% by weight HCl | Undissolved residue remaining after 24 hours |
| 3. 15% by weight HCl | Undissolved residue remaining after 24 hours |
| 4. Aqueous solution of 2 pounds/1000 gal sodium persulfate | Undissolved residue remaining after 24 hours |
| 5. Aqueous solution of ammonium bifluoride, 2 pounds/1000 gal (pH = 3.0) | Complete dissolution in 24 hours |
| 6. 0.1 M HNO$_3$ with 2 pounds/1000 gal M$_g$F$_2$ | Complete dissolution in 30 minutes |
| 7. 1 M HCl with 2 pounds/1000 gal ammonium bilfluoride | Undissolved residue remained after 24 hours |
| 8. 1% by weight HCL with 50 pounds/1000 gal ammonium bifluoride and boric acid and 5 pounds/1000 gal sodium persulfate | Complete dissolution in 15 minutes |

The results of the foregoing tests clearly illustrate the ability of the composition of the present invention to significantly dissolve filter cake. Treatment fluids 5, 6 and 8 completely dissolved the filter cake while the other treatment fluids were incapable of dissolving the filter cake or produced insoluble residues.

EXAMPLE II

A gas well in the Mesa Verde formation had been stimulated with a fracturing treatment utilizing over 200,000 gallons of a crosslinked gelled fracturing fluid containing 40 pounds of hydroxypropyl guar per 1000 gallons of fluid. The well was perforated over the depth between about 10,200 and 10,400 feet and approximately 300,000 pounds of sand had been placed in the subterranean formation during the stimulation treatment. Upon flowback of the stimulation fluid, the well failed to produce at expected levels. The presence of gelling agent filter cake was believed to be preventing gas production.

Several weeks after the stimulation treatment, the well was treated with 12,000 gallons of the treatment fluid of the present invention and shut-in for 3 hours. The treatment fluid was introduced into the propped fractures at a flow rate below the rate required to re-open the fractures. The treatment fluid had the following composition: 0.274 moles/liter HCl; 0.2 moles/liter $F^-$; 0.097 moles/liter boric acid; 0.0025 moles/liter oxidizer and a corrosion inhibitor. Upon flow-back of the treatment fluid, gas production increased to 2.5 times the pre-treatment level. The returned treatment fluid during the first 24 hours was found to contain in excess of 800 pounds of dissolved derivatized guar gelling agent resulting from dissolution of filter cake in the subterranean formation.

While that which is considered to be the preferred embodiments of the present invention has been described herein, it is to be understood that modifications and changes can be made in the described method and composition without departing from the spirit or scope of the invention as set forth in the following claims.

What is claimed is:

1. A method of dissolving a polysaccharide-containing filter cake present in a subterranean formation comprising:
   injecting an effective amount of a treatment fluid comprising a water soluble source of fluoride ions present in an amount sufficient to provide a molar concentration of from about 0.01 to about 0.5 and a source of hydrogen ions present in an amount sufficient to produce a pH in the treatment fluid in the range of from about 2 to about 4 into a subterranean formation wherein a filter cake is present; and
   maintaining said treatment fluid within said subterranean formation and in contact with said filter cake for a sufficient time to dissolve at least a portion of said filter cake.

2. The method of claim 1 wherein said treatment fluid is maintained in contact with said filter cake for at least about one hour.

3. The method of claim 1 wherein the pH of said treatment fluid is in the range of from about 2.5 to about 3.5.

4. The method of claim 1 wherein said treatment fluid contains an effective amount of boric acid whereby the precipitation of calcium fluoride in said subterranean formation is substantially prevented.

5. The method of claim 1 wherein said treatment fluid is maintained in contact with said filter cake for from about 3 to about 12 hours.

6. The method of claim 1 wherein said filter cake contains titanium or zirconium ions complexed with said polysaccharide.

7. A method of removing at least a portion of a substantially water insoluble metal ion-polysaccharide complex filter cake from a subterranean formation comprising:
   contacting said filter cake with an effective amount of a treatment fluid comprising an aqueous solution of a source of fluoride ions present in an amount sufficient to provide a molar concentration of from about 0.01 to about 0.5, said solution having a pH in the range of from about 2 to about 4, whereby at least a portion of said filter cake is dissolved.

8. The method of claim 7 wherein said treatment fluid is maintained in contact with said filter cake for from about 3 to about 12 hours.

9. The method of claim 7 wherein said treatment fluid has a pH in the range of from about 2.5 to about 3.5.

10. The method of claim 7 wherein said treatment fluid includes an effective amount of boric acid whereby the precipitation of calcium fluoride in said subterranean formation is substantially prevented.

11. The method of claim 7 wherein said treatment fluid includes an effective amount of an oxidizer capable of degrading the polysaccharide present in said filter cake upon disruption of the metal ion-polysaccharide complex.

12. The method of claim 7 wherein said metal ion comprises at least one member selected from the group consisting of titanium and zirconium ions.

13. A method of increasing the production of hydrocarbons from a well bore penetrating a hydrocarbon-containing subterranean formation following treatment of the formation with a stimulation fluid containing a polysaccharide gelling agent comprising:
   injecting an effective amount of a treatment fluid comprising an aqueous solution of a source of fluoride ions present in an amount sufficient to provide a molar concentration of from about 0.01 to about 0.5, said treatment fluid having a pH in the range of from about 2 to about 4, into said subterranean formation and maintaining said treatment fluid within said subterranean formation for a sufficient time to dissolve at least a portion of any polysaccharide gelling agent present in said formation whereby production from said subterranean formation into said well bore is increased.

14. The method of claim 13 wherein said injection is effected through said well bore penetrating said subterranean formation at a rate and pressure below that required to fracture said subterranean formation.

15. The method of claim 13 wherein said treatment fluid has a pH in the range of from about 2.5 to about 3.5.

16. The method of claim 13 wherein said source of fluoride ions can comprise at least one member selected from the group consisting of ammonium or alkali metal salt of fluoride, bifluoride, tetrafluoroborate, or hexafluorosilicate.

17. The method of claim 13 wherein said treatment fluid is maintained within said subterranean formation for at least about one hour.

18. The method of claim 13 wherein said polysaccharide gelling agent is crosslinked with a metal ion selected from the group consisting of titanium and zirconium.

19. The method of claim 13 wherein said source of fluoride ions is present in an amount sufficient to provide a molar concentration of from about 0.1 to about 0.3.

20. The method of claim 13 wherein said treatment fluid includes an effective amount of boric acid whereby the precipitation of calcium fluoride in said subterranean formation is substantially prevented.

* * * * *